Dec. 7, 1926.  
F. J. SCHRAEDER, JR., ET AL  
1,609,315  
HOISTING AND CONVEYING APPARATUS  
Filed Oct. 31 1921    4 Sheets-Sheet 1

Dec. 7, 1926.    1,609,315
F. J. SCHRAEDER, JR., ET AL
HOISTING AND CONVEYING APPARATUS
Filed Oct. 31, 1921     4 Sheets-Sheet 2

INVENTORS
Frank J Schraeder Jr
Gladstone Hovander
BY Frank J Schraeder Jr
Attorney

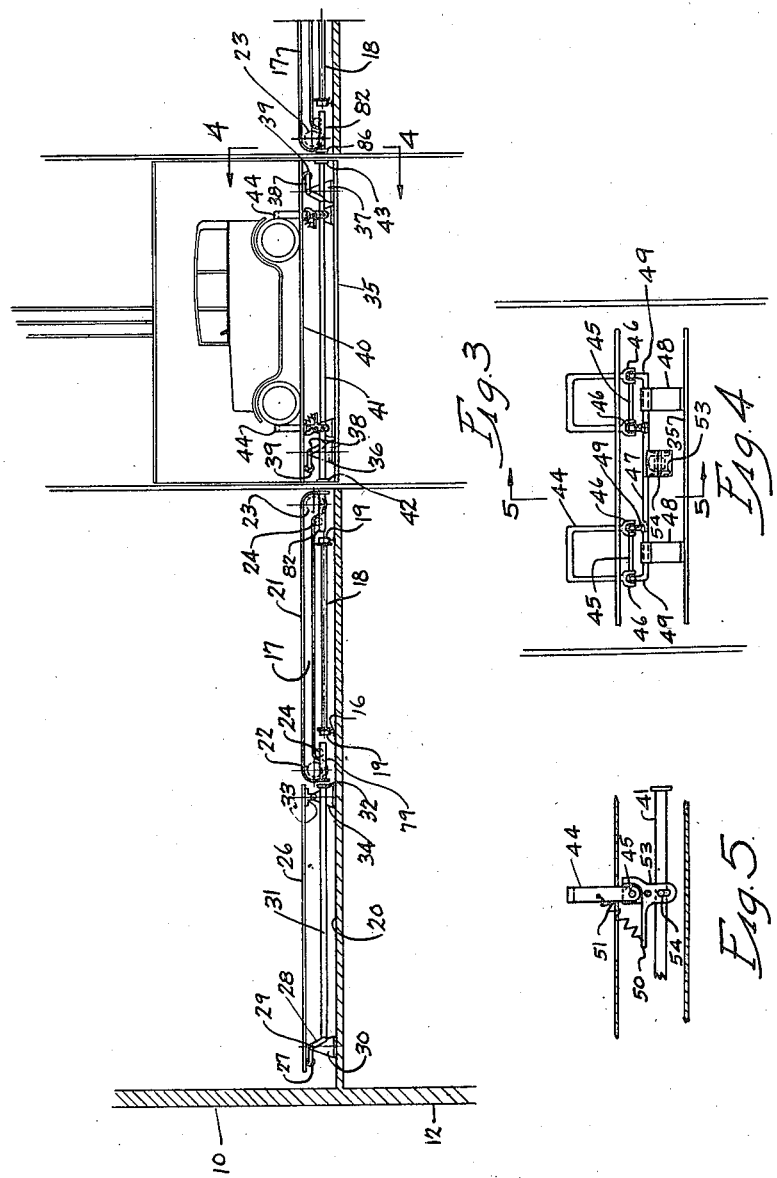

Dec. 7, 1926.
F. J. SCHRAEDER, JR., ET AL
1,609,315
HOISTING AND CONVEYING APPARATUS
Filed Oct. 31, 1921
4 Sheets-Sheet 4

INVENTORS
Frank Schraeder Jr.
Gladstone Norander
By Frank Schraeder Jr.
Attorney Patented Dec. 7, 1926.

1,609,315

UNITED STATES PATENT OFFICE.

FRANK J. SCHRAEDER, JR., OF GLEN ELLYN, AND GLADSTONE NOVANDER, OF CHICAGO, ILLINOIS; SAID NOVANDER ASSIGNOR TO SAID SCHRAEDER.

HOISTING AND CONVEYING APPARATUS.

Application filed October 31, 1921. Serial No. 511,635.

This invention relates to garages and especially to garages which are adapted for storing a large number of vehicles such as automobiles.

The invention more particularly is concerned with a garage, which has a plurality of superposed floors equipped with storage compartments, there being elevators to convey the automobiles selectively to the various floors, so as to facilitate the transfer of the automobiles to the storage compartments.

It is an object of the invention to provide means for transferring an automobile to a storage compartment and for reclaiming same from the storage compartment.

A further object aims at providing motor operated means for transferring an automobile from an elevator cage to a storage compartment and reclaiming means in said storage compartment co-operating with the motor operated means for reclaiming an automobile from storage by causing it to move toward the motor operated transfer means.

A further object constitutes the provision of a tiltable platform in an elevator cage to facilitate removal of the automobile therefrom.

A still further object comprises the provision of an elevator platform, which is tiltable in two directions for the selective removal of the automobile.

A further object aims at the provision of a tiltable floor in the stalls to facilitate removal of the cars therefrom.

It is still a further object to provide abutments in the elevator cage, which are yielding in one direction, and rigid in the opposite direction to permit introduction into the cage of a car but normally to prevent removal therefrom.

Another object aims at automatically oscillating an abutment upon tilting of the platform in the elevator cage for transferring a car into a stall.

A still further object aims at providing a traveling platform equipped with conveyers for the transfer of cars to selected storage compartments, there being stalls or compartments provided on said traveling platform also equipped with tiltable platforms.

To the accomplishment of the foregoing and other objects which will readily be apparent from the following description, one embodiment of invention comprises the means described in the specification, particularly pointed out in the claims forming a part thereof and illustrated in the accompanying drawings, in which:

Fig. 3 is a fragmentary enlarged sectional elevation.

Fig. 4 is a section on the line 4—4 of Fig. 3.

Fig. 5 is a side view of the parts shown in Fig. 4.

Figure 1:
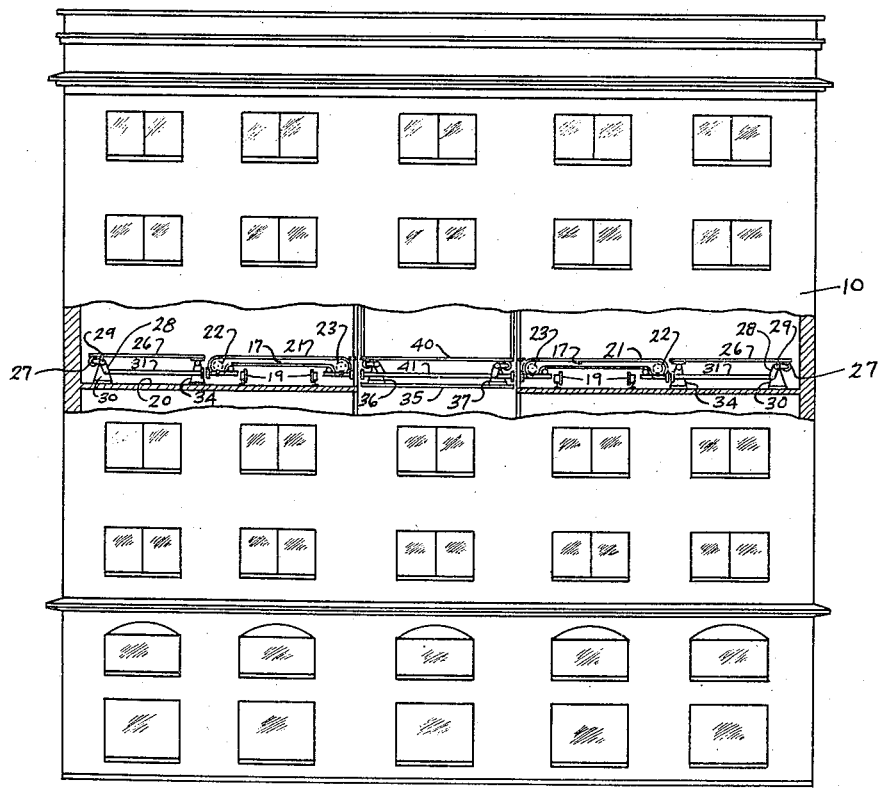
Fig. 1 is a front elevation of a building constructed in accordance with the invention.

Referring to the several views in the drawing, 10 generally designates a building of suitable construction and containing a number of floors.

Inasmuch as each floor is constructed alike and has identical equipment the description of one floor will suffice.

Figure 2:
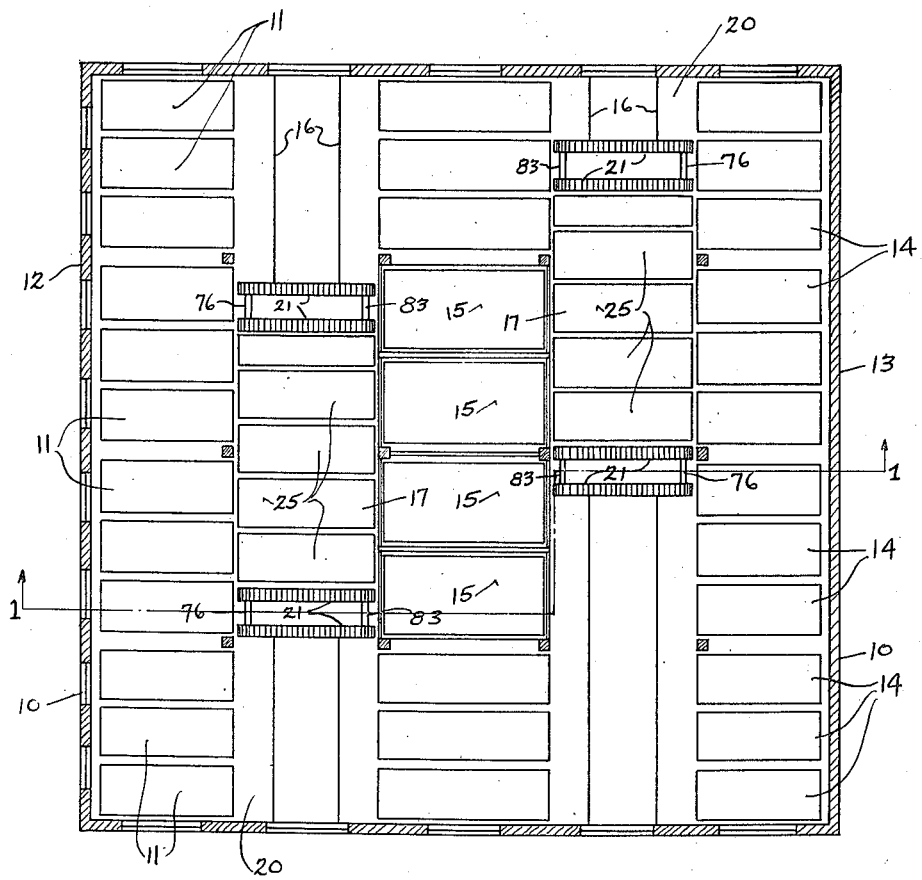
Figure 2 is a sectional plan showing a floor of the building.

The floor plan shown in Fig. 2 depicts a series of stalls or individual compartments of a size to accommodate standard types of motor vehicles. As shown, the compartments 11 are arranged along the side wall 12 of the building and are open toward the interior of the room.

A similar series of stalls 14 are arranged along the other side wall 13 extending the entire length thereof. In the center of the floor are a plurality of elevator shafts 15 in a series parallel to the side walls. The number of shafts is of course arbitrary and depends upon the capacity of the building for storing automobiles.

Intermediate the elevator shafts 15 and each series of stalls 11 and 14 respectively is a track 16 on the floor 20 parallel to the side walls and carrying a traveling platform or carrier 17 mounted on axles 18 supported by wheels 19 running on the track rails. At each end of the platform or carrier an endless conveyer belt 21 is arranged transversely of the direction of travel of the platform 17 and trained around sprocket wheels 22 and 23. Guide rollers 24 maintain the lower run of the conveyer in maximum contact with the sprocket wheels and in elevated position for clearance purposes.

In order to utilize every available space, the traveling platforms intermediate the conveyers 21 contain a plurality of stalls 25 for the storage of cars.

Referring more particularly to Fig. 3, 26 designates a tilting floor provided in each stall 11. This floor is supported at one end by a roller 27 carried at the extremity of a bell crank lever 28 pivotally mounted at 29 on a standard 30 secured to the floor 20. The other extremity of the bell crank lever is articulated with a rod 31 horizontally arranged and supported for reciprocation. The rod 31 terminates at its free end in a head 32 for a purpose hereinafter explained. The other end of the false floor 26 is provided with a depending member 33 pivotally supported on a standard 34 secured to the floor 20.

It is obvious that upon displacement of the rod 31 toward the left side, as viewed in Fig. 3, the bell crank lever 28 is oscillated so as to raise the left end of the false floor which is thus tilted to cause a movement of the car onto the conveyer 21 when the latter is arranged in alignment with the respective false floor. Assuming that the conveyer occupies such position and is in motion, then the car when reaching the adjacent conveyer end is carried thereby to the right and may be transferred into an elevator cage provided again the conveyer is in alignment therewith.

Referring now to the elevator cage the same has a floor 35 on which are arranged at each end standards 36 and 37 respectively. To these standards bell crank levers 38 are pivotally secured carrying at the free extremity a roller 39 supporting a false floor 40.

The other extremities of the bell crank levers are each pivotally connected with horizontal rods 41 which terminate in heads 42 and 43. If one of the rods 41 is shifted toward the right then the right bell crank lever on its opposite end is oscillated to raise the corresponding end of platform 40, whereby the latter is raised to discharge a car toward the left. Conversely the shifting of the other rod 41 to the left raises the opposed end of the platform for discharge of a car to the right.

The platform 40 is provided at each end with a pair of abutments 44 in the form of yokes against which the front and rear wheels may bear respectively. Each abutment terminates in forked portions 46 pivotally mounted on a rod 45. A rock shaft 47 is journaled below the abutments in standards 48 secured to the floor 35. The rock shaft 47 has upstanding arms 49 bearing against the forked portions 46 of the abutments. The inner arms 49 have a horizontal extension 50 between which and the abutment 44 a spring 51 is interposed.

From the foregoing it follows that upon oscillation of the rock shaft in one direction the arm 49 carries the abutment along which has freedom of movement in slots provided in the platform 40. The interposition of the spring 51 permits turning of the abutments independent of the associated parts so as to enable a car to drive into the cage, as will be readily understood.

The rock shaft 47 has a central depending arm 53 rigid therewith and receives in a slot at the free end thereof a pin 54 secured in the rod 41. Upon reciprocation of the rod 41 there is a concomitant oscillation of one bell crank lever 38 and the adjacent abutment whereby the discharge of a car into the traveling platform or conveyer is facilitated and initiated.

To actuate the various tilting floors, carriers, conveyers and other parts, each floor is provided with an operating mechanism presently to be described. As shown more in detail in Fig. 6 the traveling platform or carrier is equipped with a reversible electric motor 55, on the shaft of which a pinion 56 meshes with a gear 57 of a shaft 58 journaled in suitable bearings. At the other end of the shaft a gear 59 meshes with a gear 60 keyed on a shaft 61 in alignment with the shaft 18, and having splined thereon a coupling member 62 co-operating with a coupling member 63 of the shaft 18 to rotate the same for the propulsion of the platform 17. The coupling member 62 is controlled by a bell crank lever 64 connected at one extremity to a link 65 articulated with one extremity of a bell crank lever 66, whose other extremity is pivotally secured to a link member 67 articulated with a swinging hand lever 68. The oscillation of the lever 68 in one direction causes shifting of the clutch member 62 and transmission of the rotary movement of the shaft 61 to the wheeled shaft 18.

The shaft 61 carries a terminal bevel gear 69 in mesh with a bevel gear 70 on a longitudinal shaft 71, which at its end has splined thereto clutch members 72 and 73 respectively, co-operating respectively with clutched members 74 and 75 on shaft sections 76 and 77. The latter have keyed thereto the sprocket wheels 22 around which the endless conveyer 21 is trained. The clutch members 72 and 73 are also controlled by levers and links as will be obvious from Fig. 6 so that further description is deemed superfluous. On the conveyer shafts 76 and 77 a gear 78 is loosely arranged which meshes with a rack 79 supported for reciprocation and terminating in a head 80. A clutch 81 connects for actuation by a lever and link system the gear 78 to the shaft to obtain displacement of the rack 79.

Figure 6:
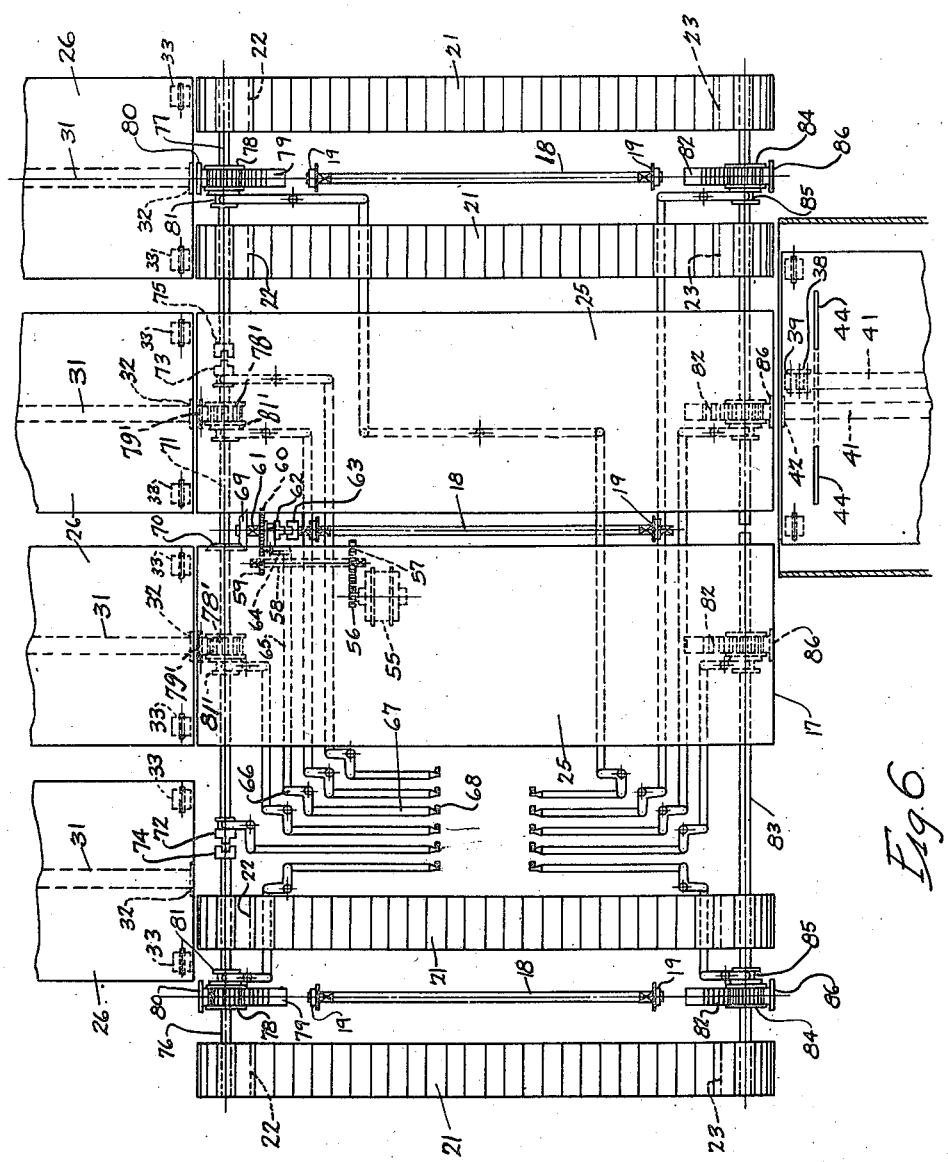
Fig. 6 is a more or less diagrammatic plan view of the operating mechanism.

The other side of the traveling platform is also equipped with racks 82, adapted to be reciprocated by gears 84 loosely mounted on a shaft 83 and connected thereto by a clutch 85 controlled by levers and links as will readily appear from Fig. 6.

The motor control on the traveling platform for reversing the motor may be of any well known or suitable type and hence is not illustrated.

In order to store an automobile in a stall on any floor the following steps are taken: An elevator cage, being level with the ground floor and preferably of the automatic type i. e. arranged to stop at a certain floor in accordance with the setting of a switch, is opened so that an automobile may be driven into the cage, depressing the adjacent abutment 44 and stopped by the remote abutment. Thereafter the elevator is set and goes up to a certain predetermined floor where it is automatically stopped. Then the traveling platform 17 is actuated to bring the conevyer 21 in alignment with the car in the elevator cage.

To this end the lever 68 is oscillated bringing the clutch member 62 and 63 into engagement whereby the shaft 18 is revolved and the platform 17 shifted. Upon reaching the aligning position the lever 68 is restored to normal position.

The clutch 72 and 74 (or clutch 73 and 75 for the opposite end conveyer 21) is then placed in operative position by the throw of the appertaining lever to cause revolving of the shaft 76 and of the conveyer 21, whereby the shaft 83 is rotated. Upon oscillation of the lever appertaining to the clutch which connects the proper rack 82 with the shaft, the head 86 of the rack is brought into engagement with the aligning head 42 of the rod 41, causing raising of the platform 40 at the opposite end, and lowering of the adjacent abutment 44. The car coasts then on the inclined platform onto the conveyer 21 and is carried by the conveyer until it occupies a central position thereon, at which time the clutch 72, 74 is disengaged. The platform is then shifted to bring the automobile into alignment with a certain stall or compartment by the actuation of clutch 62 and 63 and consequent rotation of shaft 18. Thereafter the platform is stopped by disengaging clutch 62 and 63, and the conveyer is again placed in operation by engagement of clutch 72 and 74.

The removal of a car from a compartment is obtained by bringing the conveyer in alignment with the compartment in the described manner. Then the rack 79 is displaced by throwing in the clutch 81, and the push rod 31 is shifted to raise the rear end of compartment floor 26, so that the vehicle coasts down onto the conveyer 21, thence it is transferred into an elevator. In this case, of course, the motor is reversely driven, so that the conveyer runs in an opposite direction to that for storing an automobile in a compartment.

The removal of a vehicle from a compartment 25 on the platform 17 is accomplished by the operation of a clutch 81' which is keyed to the shaft 71 and operatively connected to the gear 78'. The gear 78' is arranged to reciprocate, by the reversible operation of the motor 55, a vertically operating rack 79' for raising the end of the tilting floor of the compartment 25 when such compartment is in alignment with the elevator. All tilting floors of all storage compartments are normally positioned on a slight angle sloping downward from the elevator discharge and from the traveling platform conveyer discharge, and all tilting floors 11, 14 and 25 are provided with means for raising the lower end thereof in reclaiming of the vehicle.

The foregoing will suffice to enable the understanding of the various operations which are carried out when an automobile is transferred from an elevator to one of the compartments 11 or 14 or removed therefrom.

The various arrangements and constructions of parts for the successful operation of a garage having a great capacity constitute the preferred embodiment of the invention. Various other ways may be conceived in which the principle underlying the invention may be applied to solve the problem of providing a garage adapted to house a larger number of machines.

While we have claimed the invention in its preferred embodiment and use as a garage for motor vehicles, we do not wish to limit ourselves to the use of the invention as here presented, as it is readily apparent that instead of automobiles, large containers or large boxes on wheels or rollers could be placed into the storage compartments, thus utilizing our invention for the storage and handling in general of any units, likewise that these units could be made without any wheels or rollers, but that the storage compartments could be provided with suitable rollers into which the units could be deposited for storage, or the units could again be placed on separate platforms which would slide into the storage compartments.

It is, therefore, not the intention of confining the invention to the details of construction and design as shown, but to include all modifications constituting departures within the scope of the invention as defined by the appended claims.

We claim:

1. In a garage, having a plurality of floors provided with individual compartments, elevators for lifting a car to a selected floor, means for transferring a car from an elevator to a compartment and means controlled by said first named means for facilitating the discharge of a car from said elevator to said transferring means.

2. In a garage, having a plurality of floors, individual compartments arranged on said floors, relatively fixed elevators for lifting a car to a selected floor, and means for transferring a car from an elevator to a compartment, said elevators having a tiltable platform operated by said means.

3. In a garage having a plurality of floors, individual compartments arranged on said floors, elevators for lifting a car to a selected floor, carriers for transferring a car to a compartment and means actuated by said carriers for facilitating the discharge of a car from said elevators.

4. In a garage having a plurality of floors, individual compartments arranged on said floors, elevators for lifting a car to a selected floor, carriers on said floors for transferring a car to a compartment, means for arranging a carrier in operative position with respect to an elevator and a compartment, and means actuated by said carriers for facilitating the discharge of a car from said elevators.

5. In a garage having a plurality of floors, individual compartments arranged on said floors for storing automobiles, tiltable floors provided in said compartments, and a conveyer platform arranged to receive the automobiles from said tilting floors.

6. In a garage having a plurality of floors, individual compartments arranged on said floors, carriers provided on said floors for removing cars from said compartments, and means disposed in said compartments for facilitating the discharge of a car therefrom onto said carriers.

7. In a garage, individual compartments adapted to discharge cars stored therein under gravity, and a cooperating conveyer platform arranged to receive said cars and to control the discharge operation of said compartments.

8. In a garage, individual compartments for storing cars, tiltable floors provided in said compartments, a traveling platform, and a conveyer on said platform adapted to receive the cars from said tiltable floors.

9. In a garage having a plurality of floors, individual compartments arranged on said floors, carriers co-operating with said compartments for removing cars therefrom, and means actuated by said carriers for facilitating the discharge of a car from said compartments onto said carriers.

10. In a garage having a plurality of floors, individual compartments arranged on said floors, carriers co-operating with said compartments for removing cars therefrom, and means arranged in said compartments and actuated by said carriers for facilitating the discharge of a car from a compartment onto said carrier.

11. In a garage having a plurality of floors, individual compartments arranged on said floors, a plurality of elevators fixed relatively to said compartments, traveling platform co-operating with said compartments for removing cars therefrom and discharging same onto said elevators, and tiltable floors arranged in said compartments and on said platform for facilitating the discharge of a car therefrom.

12. In a garage having a plurality of floors, individual compartments arranged on said floors, a plurality of elevators fixed relatively to said compartments, carriers co-operating with said compartments for removing cars therefrom for transfer to said elevators, tiltable floors arranged in said compartments for facilitating the discharge of a car therefrom, and means for actuating said tiltable floors.

13. In a garage having a plurality of floors, individual compartments arranged on said floors, carriers co-operating with said compartments for removing cars therefrom, tiltable floors arranged in said compartments for facilitating the discharge of a car therefrom, and carrier operated means for actuating said tiltable floors.

14. In a garage having a plurality of floors provided with individual compartments, an elevator for lifting a car to a selected floor, a carrier, mechanism for removing a car from said elevator to said carrier, and means for facilitating discharge of a car from said elevator.

15. In a garage having a plurality of floors provided with individual compartments, an elevator for lifting a car to a selected floor, a carrier, mechanism for removing a car from said elevator to said carrier, and means provided in said elevator for facilitating discharge of a car therefrom.

16. In a garage having a plurality of floors provided with individual compartments, an elevator for lifting a car to a selected floor, a carrier, mechanism for removing a car from said elevator to said carrier, and means provided in said elevator and actuated by said mechanism for facilitating discharge of a car therefrom.

17. In a garage, an elevator, a tiltable floor in said elevator, a carrier, tiltable abutments on said floor adapted to hold a car in position, and means operated by said carrier to release said abutments.

18. In a garage, an elevator, a floor adapted to be tilted in said elevator, a carrier, tiltable abutments on said floor adapted to hold a car in position, means for tilting said floor and said abutments operatable by said carrier.

19. In a garage, an elevator, a floor tiltably supported in said elevator abutments movably arranged on said floor, means for tilting said floor and one of said abutments to permit a car to be discharged from said floor, and a carrier co-operating with said elevator for the removal of a car, said carrier actuating said tilting means.

20. In a garage having a plurality of floors, individual compartments arranged on said floors, false floors provided in said compartments for tilting, carriers co-operating with said false floors for removing a car from said compartment, and means co-operating with said carriers, and including a push rod and a bell crank lever connected thereto for tilting said false floors.

21. In a garage, an elevator, a floor adapted to be tilted in said elevator, tiltable abutments on said floor adapted to hold a car in position, a carrier co-operating with said elevator for the removal of a car, and means including a push rod and bell crank levers connected thereto for tilting said floor and abutments to permit gravity discharge of a car, said tilting means being operated by said carrier.

22. In a garage having rows of compartments for the storing of cars, elevators between rows of compartments, and shiftable carriers transferring cars from said elevators to said compartments selectively, each of said carriers being shifted and operated by a single source of power.

23. In a garage having a plurality of floors, rows of compartments for the storing of cars on each floor, an elevator adjacent one of said rows of compartments, a platform traveling between said compartments and adjacent said elevator, a conveyer on said platform adapted to transfer a car from said elevator to any one of said compartments, car reclaiming means for each of said compartments, and a single source of power for shifting said platform, actuating said conveyer and said reclaiming means.

24. In a garage having a plurality of floors, rows of compartments for the storing of cars on each floor, tiltable floors in each compartment, elevators between rows of compartments, platforms travelling between said compartments and elevators, and conveyers on said platforms adapted to transfer a car from said compartments to said elevators, said platforms being adapted to tilt the compartment floors.

25. In a garage having a plurality of floors, rows of compartments for the storing of cars on each floor, elevators between said rows of compartments, tiltable floors in said elevators, platforms travelling between said compartments and said elevators, and conveyers on said platforms adapted to transfer cars from said elevators to said compartments, said platforms being adapted to tilt the elevator floors.

26. In a garage having a plurality of floors, rows of compartments for the storing of cars on each floor, elevators between said rows of compartments, tiltable floors in said elevators, platforms travelling between said compartments and said elevators, conveyers on said platforms adapted to transfer cars from said elevators to said compartments, said conveyers being adapted to tilt the elevator floors, and a single means for moving said platforms and actuating said conveyers.

27. In a garage having a row of compartments for the storage of vehicles, an elevator, a traveling platform, a tilting floor for each of said compartments, means on said elevator controlled by said traveling platform for discharging a vehicle from the elevator, and means on said platform for tilting said tilting floors to reclaim a vehicle.

28. In a garage having a row of compartments for storing vehicles therein, an elevator, a traveling platform arranged to transfer the vehicles from said elevator into said compartments, means in said compartments for moving the vehicles toward said platform, and mechanism controlled by said platform for actuating said means to remove the vehicle from the compartment onto said platform.

29. In a garage having a row of compartments for storing vehicles therein, a traveling carrier arranged to travel alongside of said compartments and to transfer vehicles to said compartments, means in said compartments for moving the vehicles to said carrier, and mechanism controlled by said carrier for actuating said means to reclaim the vehicles from either of said compartments onto said carrier.

30. In a garage having adjacent rows of compartments for storing vehicles therein, a traveling carrier arranged to travel between said rows of compartments and to transfer vehicles to said compartments, means in said compartments for moving the vehicles to said carrier, and mechanism controlled by said carrier for actuating said means to reclaim the vehicles from either of said compartments onto said carrier.

31. In a garage having a row of compartments for storing vehicles therein, a traveling carrier arranged to travel alongside of said compartments and to transfer vehicles to said compartments, means in said compartments for moving the vehicles to said carrier, and mechanism for actuating said means to reclaim the vehicles from either of said compartments onto said carrier.

32. In a garage having a plurality of superposed floors and a row of compartments for storing vehicles on each of said floors, elevating means for raising vehicles to any predetermined floor, a traveling carrier on each floor arranged to carry an operator thereon and adapted to receive the vehicles for transfer from said elevating means to said compartments, reclaiming means for each of said compartments arranged for moving the vehicle to said carrier, and mechanism controlled by the operator on said carrier for actuating said reclaiming means.

33. In a garage having a plurality of superposed floors and a row of compartments for storing vehicles on each of said floors, elevating means for raising vehicles to any predetermined floor, a traveling carrier on each floor arranged to carry an operator thereon and adapted to receive the vehicles for transfer from said elevating means to said compartments, reclaiming means for each of said compartments arranged for moving the vehicle to said carrier, and mechanism controlled by the operator on said carrier for actuating said elevating means to transfer a vehicle from said elevating means to said carrier, and additional mechanism controlled by said operator for actuating said reclaiming means.

34. In a garage having a plurality of superposed floors and a plurality of compartments for storing vehicles on each of said floors, elevating means for raising vehicles to any predetermined floor, a traveling carrier on each floor adapted to receive the vehicles for transfer from said elevating means to said compartments, reclaiming means for each of said compartments arranged for moving the vehicle to said carrier when said carrier is in register with a compartment from which the vehicle is to be moved, and mechanism operable after the positioning of said carrier for actuating said reclaiming means.

35. In a garage having a plurality of superposed floors and a plurality of compartments for storing vehicles to any predetermined floor, elevating means for raising vehicles to any predetermined floor, a traveling carrier on each floor adapted to receive the vehicles for transfer from said elevating means to said compartments, reclaiming means for each of said compartments arranged for moving the vehicle to said carrier when said carrier is in register with a compartment from which the vehicle is to be moved, and mechanism operable after the positioning of said carrier for actuating said elevating means to transfer a vehicle from said elevating means to said carrier, and additional mechanism also operable after the positioning of said carrier for actuating said reclaiming means.

36. A storage floor having a plurality of storage compartments, in combination with a carrier adapted to travel alongside of said compartments and to assume stationary position in register with any one of said compartments to discharge a storage unit or to receive a stored unit therefrom, reclaiming means for each of said compartments for moving the stored units to said carrier when said carrier is in register with a compartment from which the storage unit is to be moved, and mechanism operable upon the register of said carrier with one of said compartments for actuating said reclaiming means.

37. In a storage system, and in combination, an elevator, a storage table adapted to travel along side of said elevator and having a plurality of storage compartments thereon, said table adapted to register either of said storage compartments with said elevator to receive a storage unit therefrom, a tilting platform mounted in each of said storage compartments, means for shifting said table along side of said elevator, and means for tilting the tilting platform of a compartment which is in register with said elevator to discharge the storage unit onto said elevator.

In witness whereof, we have hereunto subscribed our names this 29th day of October, 1919.

FRANK J. SCHRAEDER, Jr.
GLADSTONE NOVANDER.